Feb. 20, 1934.  G. E. DENHART  1,947,760
TIRE DEFLATION INDICATOR
Filed May 25, 1932   2 Sheets-Sheet 1
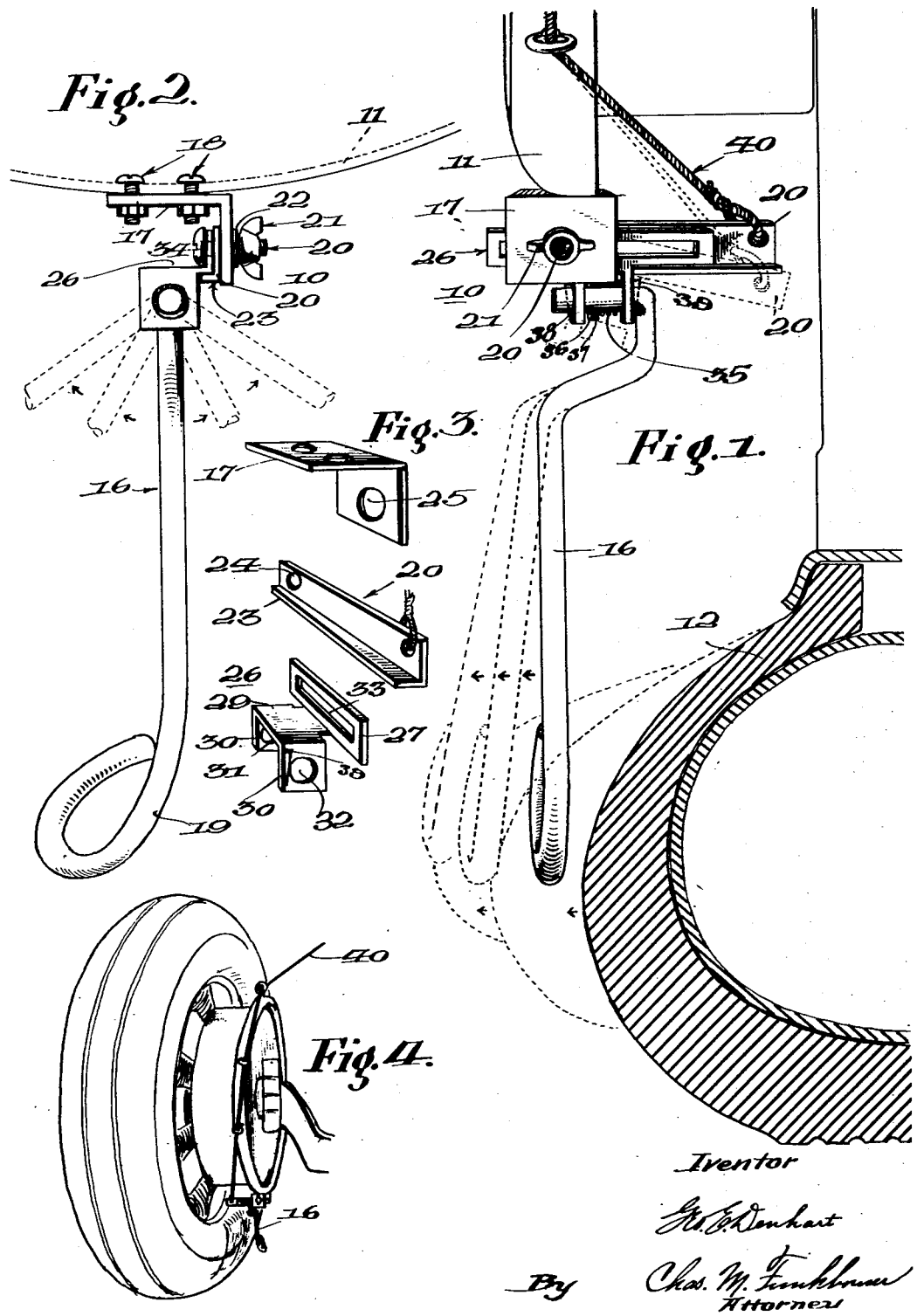

Feb. 20, 1934.   G. E. DENHART   1,947,760
TIRE DEFLATION INDICATOR
Filed May 25, 1932   2 Sheets-Sheet 2
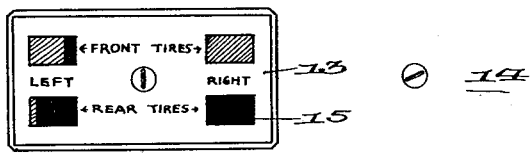
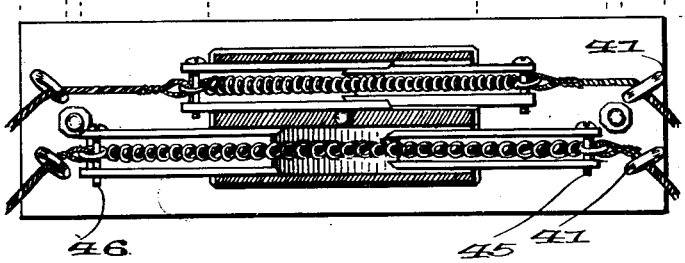
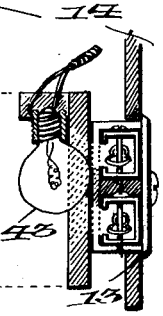
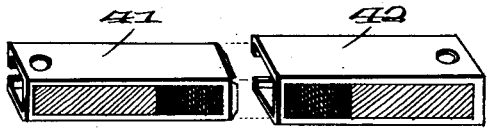
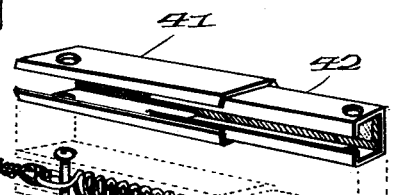
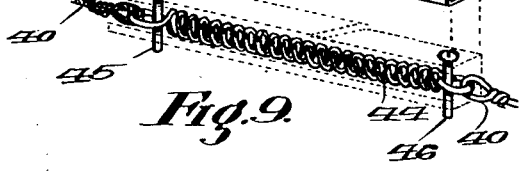
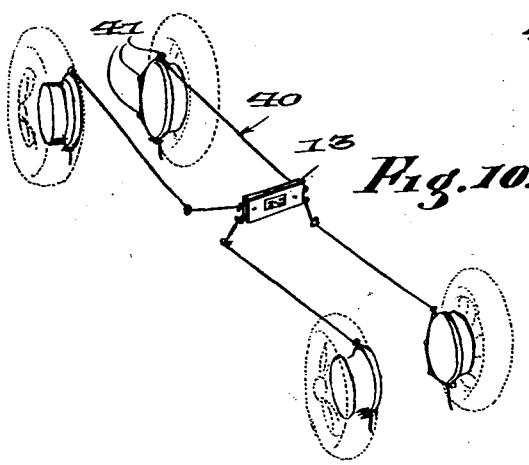
Inventor
Geo. E. Denhart.
By Chas. M. Funkhouser
Attorney Patented Feb. 20, 1934

1,947,760

UNITED STATES PATENT OFFICE 1,947,760

TIRE DEFLATION INDICATOR

George E. Denhart, Pittsburgh, Pa.

Application May 25, 1932. Serial No. 613,530

4 Claims. (Cl. 116—34)

This invention relates to tire deflation indicators for automobiles and more particularly to a visual indicator which shall be located in view of the operator and indicate the conditions of the tires during the operation of the vehicle.

One object of the present invention is to provide a tire deflation indicator in which there shall be a continuous contact relation between the indicator and each of the four tires of the vehicle when any one of the tires becomes deflated.

Another object of the invention is to provide apparatus of the character designated which shall provide mechanical connections between the point of contact with the tires and the indicator, to constantly indicate the different degrees of deflation of the individual tires.

Another object of the invention is to provide a novel form of indicator instrument which shall provide positive mechanical connections with each of the four tires of the vehicle so as to constantly indicate the varying degrees of deflation of each individual tire.

A further object of the invention is to provide a tire deflation indicator of the character designated which shall be durable in construction, efficient in operation and which may be readily installed on all types of motor vehicles employing pneumatic tires.

These and other objects of the invention will be more manifest from the following specification and drawings and more particularly set forth in the claims.

In the drawings:

Fig. 1 is a front view in elevation showing the application of my invention to the wheel of a motor vehicle;

Fig. 2 is a side view of the apparatus shown in Fig. 1;

Fig. 3 is a developed view showing the elements of the supporting bracket shown in Fig. 1;

Fig. 4 is a perspective view showing the apparatus mounted on a vehicle brake drum;

Fig. 5 is a front view of the indicator;

Fig. 6 is a rear view of the indicator shown in Fig. 5;

Fig. 7 is an end view of the apparatus shown in Fig. 6;

Fig. 8 is a front perspective view of the indicator elements;

Fig. 9 is a rear view of the apparatus shown in Fig. 8; and

Fig. 10 is a diagrammatic view showing the connections of the indicator to the four vehicle wheels.

Referring to Figures 1, 2, and 3 of the drawings, there is shown a tire deflation indicator mechanism constructed and arranged in accordance with the present invention. In this embodiment of the invention, an actuator device 10 is mounted on a brake drum 11 so as to be in close proximity to the vehicle tire indicated by the numeral 12. This arrangement provides that the actuator shall have a continuous mechanical connection with an indicator device 13, mounted on the instrument board 14 of the vehicle and in full view of the operator. This construction permits the operator to observe at all times the degree of deflation of the tires and thereby avoid any of the inconveniences and serious consequences frequently experienced in operating vehicles with underinflated tires.

One of the features of the present construction is, that there is provided a continuous contact relation between the deflated tire and the indicator so that the degree of deflation of an individual tire may be constantly indicated to the operator by a change of color exhibited in the indicator 15 as hereinafter described.

The connections for carrying out the present construction include a tire contact arm 16 pivotally mounted on a bracket 17 which may be conveniently mounted on the brake drum 11 of the wheel. The bracket is secured by tap screws or other suitable fastening means indicated by the numerals 18—18. The tire contact device is provided with a depending arm 19 provided with a curved shaped lower extremity which shall engage the rim of the tire.

The arm 16 is carried by an arm 20 pivotally connected to the bracket 17 by means of a bolt 20', wing nut 21 and a yieldable connection 22, which may be in the form of a resilient washer or coil spring. The arm 20 is provided with a lower flange portion 23 and an aperture 24 which is adapted to register with a corresponding aperture 25 in the bracket 17. Supported by the flange 23 is a slidable bracket member 26 provided with a vertically disposed plate 27. This member is provided with a horizontal extremity 29 and downwardly extending projections 30—30 and these projections are each provided with apertures 31—32 for receiving the upper L shaped extremity of the arm 16.

The vertical plate 27 is provided with a longitudinal slot 33 which provides for lateral adjustment of the actuator arm 16 relative to the tire 12. In order to facilitate the assemblage of the parts, the pivot bolt 20' is provided with a square shank 34 which shall fit into the slot 33 and thereby serve to hold the bolt from turning when tension is exerted by the wing nut 21.

The arm 16 is yieldably mounted on the bracket 26 so that it shall be normally maintained in a downward direction and in engagement with the tire whenever it becomes deflated for any reason, and also to permit it to swing laterally if engaged by a road obstruction. In order to provide for this lateral swinging movement, the upper horizontal end of the lever 16 is mounted in the bracket projections 30—30 by means of a coil spring 35, cotter pin 36 and a washer 37. Formed integral with the projections 30—30 and located thereon are two cam surfaces 38 and 39 respectively. Cam 39 for example, is adjacent the upper curved portion of lever 16, Fig. 1, and held in engagement by spring 35. It will thus be noted that if the lever is caused to swing laterally by striking a road obstruction, the lever 16 moves axially and rides up the cam surface under tension of spring 35. As soon as the obstruction is passed over, the spring and cam surface co-act to return the lever 16 to the normal downward direction. The inward movement of the arm 16 is arrested by the arm 20 engaging the top of the bracket 17 and thus the arm 16 is normally carried out of contact with a properly inflated tire. This limiting movement also serves as a stop or limiting means for another cable connected to a corresponding wheel as hereinafter described.

From the above description, it will be noted that the tire engaging arm 16 with its curved portion 19, may swing forwardly and rearwardly and, at the same time move at right angles in response to any deflation of the associated tire, as shown in Fig. 1. Another feature of the above construction and arrangement of parts is that all the elements are interchangeable so as to be applicable to all four wheels. For example, only cam surface 38 is shown in operation, but if the bracket 26 is applied to the opposite wheel, cam 39 will be utilized.

The actuator 10 is connected to the indicator 13 on the dash of the vehicle by a cable connection 40, carried by appropriate eyelet guides indicated by the numerals 41—41.

The indicator 13 is arranged to give color indications to show the various degrees of deflation, for example, when the tires are fully inflated, green will be visible to the operator; but if a tire is partially deflated, green and red will appear, and if the tire is flat or nearly so, the indicator for that tire will show only red.

The color indicator members for each tire comprise a pair of hollow members 41 and 42 in telescopic relation as shown in Figs. 6, 7, and 8 and provided with colored sections on the front faces thereof in proportion to the extent of movement before the aperture 15. The color members 41 and 42 are made transparent that they may be illuminated from any convenient source, such as an electric lamp indicated by numeral 43.

The members 41 and 42 are connected by a centrally disposed spring 44 connected at the respective ends by pin members 45 and 46. These pin members also provide connections to the ends of the cable 40 leading to an actuator. The arrangement of the indicator 13 is such that the lower indicia are interconnected to register the condition of the rear tires and in a similar manner, the upper indicia indicate the condition of the front tires. The general arrangement is illustrated in Fig. 10.

Having thus described apparatus constructed and arranged in accordance with my invention, the operation thereof is carried out in the following manner. Assume that the actuators 10 are mounted on the vehicle brake drum and connected to a central indicator 13. For example, should the right rear tire become deflated, the actuator arm 16 will move to the left and rock the arm 20 as shown in dotted lines. This movement will cause the connected cable 40 to draw indicator member 42 to the right, against the tension of spring 44, and indicate a red color which is the danger signal of deflation. During this tension, the actuator bracket 20 for the corresponding opposite wheel serves as a positive stop for the cable system connecting the two rear wheels. However, should the left rear tire become partially deflated at the same time, the movement of the left rear actuator will also move indicator 41 against the tension of the same spring 44. In a similar manner, the varying degrees of deflation of the front tires may be indicated.

It will thus be observed that I have provided a mechanical tire deflation indicator which is connected to the four wheels of the vehicle in such a manner that as soon as any one of the tires becomes partially or wholly deflated, this condition is immediately indicated to the operator of the vehicle.

Having thus described the preferred embodiment of my invention, it is obvious that various changes may be made in the construction and arrangement of the parts thereof without departing from the scope of the invention as set forth in the claims.

What I claim is:

1. A tire deflation indicator of the character described comprising, a frame having an aperture therein, a movable indicator member having indicia thereon and supported adjacent to the aperture in said frame, connections between said indicator member and a tire contacting element, and means included in said connections for holding said tire contacting element into engagement with the tire and for moving the indicator member relative to said aperture when the tire becomes deflated.

2. A tire deflation indicator of the character described comprising, a frame having an aperture therein, a movable indicator member having indicia thereon and supported adjacent to the aperture in said frame, a continuous mechanical connection between said indicator member and a tire contacting element, and means included in said mechanical connection for yieldably holding said tire contacting element into continuous engagement with the deflated tire and for moving the indicator member relative to the aperture, whereby the indicia shall indicate different degrees of deflation.

3. In a tire deflation indicator of the character described comprising, a frame having a pair of apertures therein, a pair of indicator members having indicia thereon and movable relative to the respective apertures to indicate the degree of deflation of a pair of tires, a yieldable connection between the indicator members for holding the same in a predetermined position, an actuator member located adjacent to each of said tires, and connections between each actuator and one of the indicator members, said connections including the yieldable connection.

4. In a tire deflation indicator of the character described comprising an indicator dial, an indicator member mounted adjacent to said dial and movable relative thereto, connections between said indicator member and a tire contacting element, and means included in said connections for holding said tire contacting element into engagement with the tire and for moving the indicator member relative to the dial when the tire becomes deflated.

GEORGE E. DENHART.